UNITED STATES PATENT OFFICE.

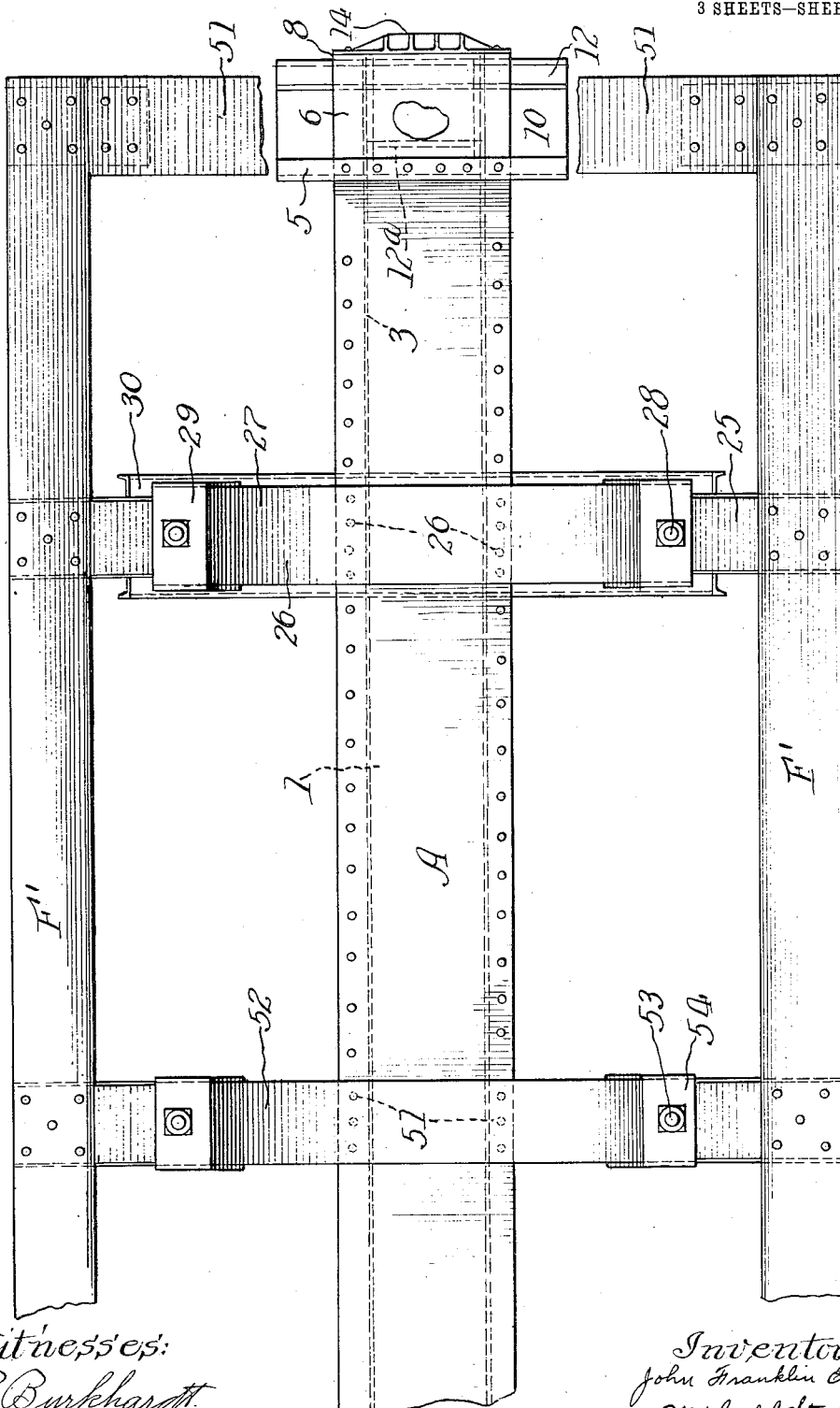

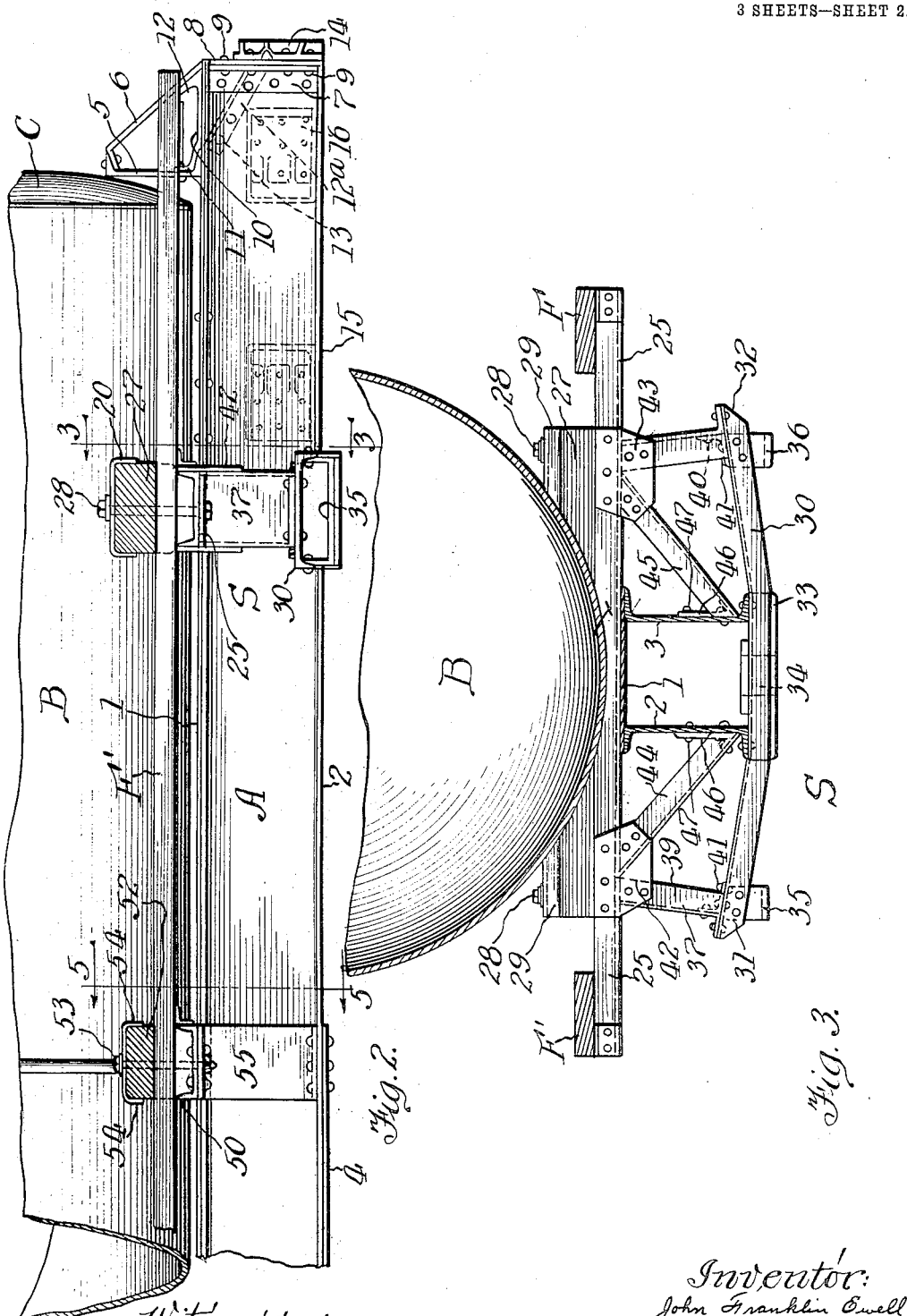

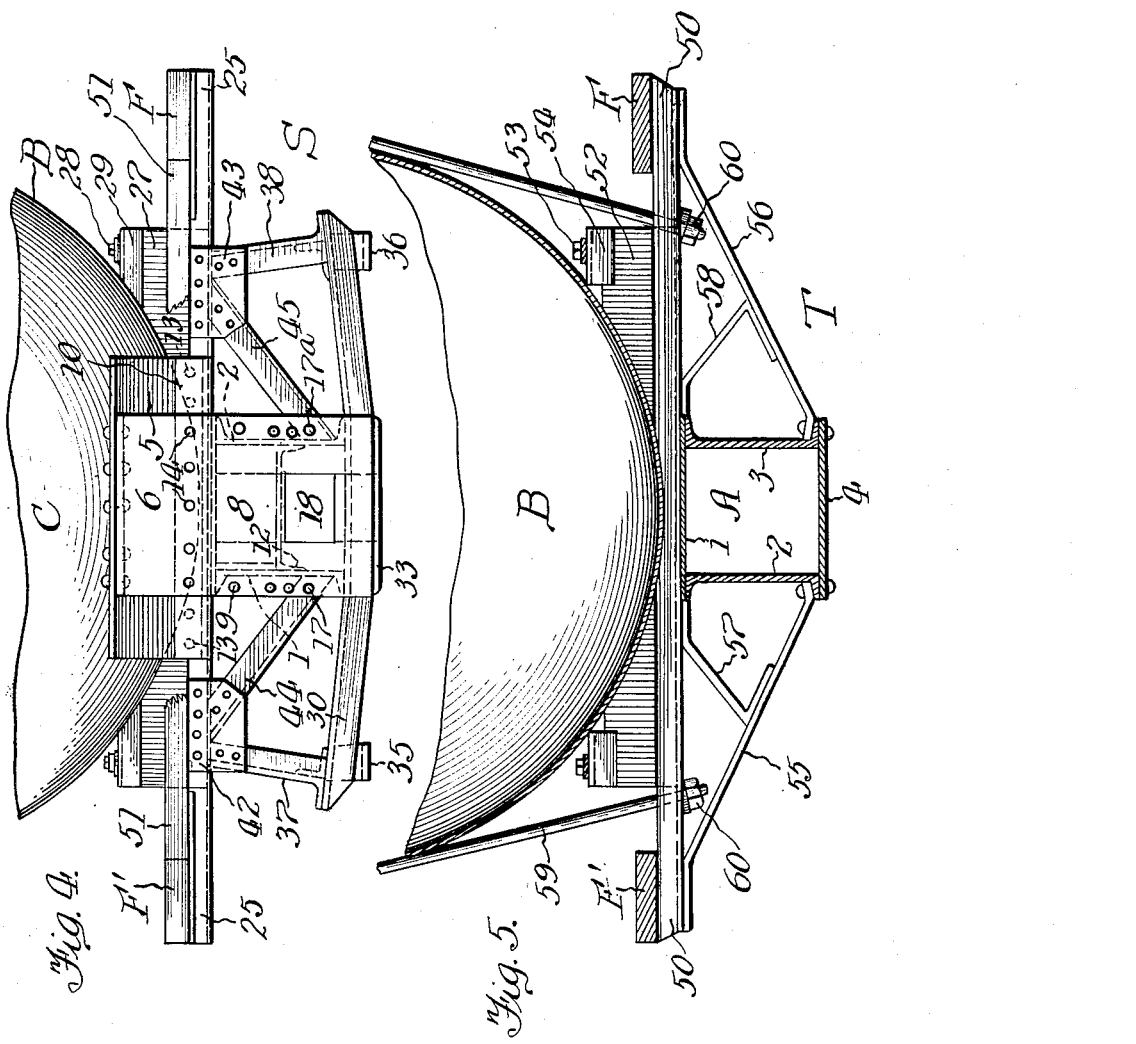

JOHN FRANKLIN EWELL, OF CHICAGO, ILLINOIS, ASSIGNOR TO BARRETT MANUFACTURING COMPANY, OF CHICAGO, ILLINOIS, A CORPORATION OF WEST VIRGINIA.

UNDERBODY FOR TANK-CARS.

1,099,434.  Specification of Letters Patent.  Patented June 9, 1914.

Application filed February 13, 1914. Serial No. 818,509.

*To all whom it may concern:*

Be it known that I, JOHN FRANKLIN EWELL, a citizen of the United States, and a resident of the city of Chicago, in the county of Cook and State of Illinois, have invented certain new and useful Improvements in Underbodies for Tank-Cars; and I do hereby declare that the following description of my said invention, taken in connection with the accompanying sheet of drawings, forms a full, clear, and exact specification, which will enable others skilled in the art to which it appertains to make and use the same.

My invention relates generally to improvements in underbody for tank cars, and it consists, essentially, in the novel and peculiar combination of parts and details of construction, as hereinafter first fully set forth and described and then pointed out in the claims.

In the drawings already referred to which serve to illustrate my said invention, Figure 1 is a plan of my improved underbody for a tank car, the trucks and wheels upon which body is adapted to be mounted not being shown as they are not part of my invention. Said plan discloses only one end of the car body as the other end is of like construction. Fig. 2 is a side elevation of one end of said body showing a fragment of the tank proper in place. Fig. 3 is a vertical transverse section in line 3—3 of Fig. 2. Fig. 4 is a front or rear view (both being alike) of the body with the coupler bumper removed for the sake of more clearly showing the construction. Fig. 5 is a vertical transverse section in line 5—5 of Fig. 2.

It is now to be noted that I have shown no brake wheels, brake levers, links or rods, ladders and other paraphernalia with which tank cars are usually equipped. These elements are no part of my invention and standard M. C. B. parts may be employed.

Like parts are designated by corresponding characters or symbols in all the figures of the drawings.

A car body or underframe for tank cars for conveying and transporting liquids must possess peculiar qualities to withstand the terrific shocks and reactions incident to the material transported. A car frame of such strength and rigidity as to withstand and absorb the multiplicity of strains while in service, and the reactions created by the flow to and fro of the liquid in the tanks, would last only a very short time by reason of the incessant stress and stress reversals causing fatigue of metal and resultant breaks in the frame.

An underbody capable of the greatest mileage must possess a certain degree of resiliency, so that a slight deflection or deformation may take place in order to a great extent dissipate the strains created.

To better understand my invention, I now refer to the drawings in which A is a box shaped longitudinal girder extending from one end to the other of the car frame. This girder is produced by a pair of parallel, spaced apart channel irons 2 and 3 of suitable weight and dimensions connected together by a top cover plate 1 extending throughout the entire length of the channels and thoroughly riveted to the flanges thereof at spaced intervals. Along the lower face of this girder A, medially of the length thereof, and extending in either direction a sufficient distance to meet the necessary requirements is a shorter lower cover plate 4, similarly riveted to the lower flanges of the channels 2 and 3.

At a short distance from each end of girder A there is securely riveted a transverse upstanding channel 5, the length of which exceeds the width of the box-girder A, so that said channel projects equally beyond said box-girder on either side. Fastened to the upper flange of the said channel 5, of a width equaling the width of the girder is a bent plate 6. Said plate is bent downwardly until the same fits the upper corner of the girder end, where it is bent down vertically at 8, so as to close contact with the girder ends. Corner angles 7 fastened to the ends of channels 2 and 3 and suitable rivets 9 are employed to maintain this lower end 8 in fixed position against the girder ends.

Located on the top face of girder A, transversely thereof, and in the space between channel 5 and plate 6 there is a short channel 10, the flanges 11 and 12 of which are bent their entire length to closely contact with the said channel 5 and plate 6, rivets 13 and 14, respectively, being used to produce rigid connection of these parts. Said channel is also riveted to the top face of girder A for additional rigidity.

Between channels 1 and 2 at the very end thereof is located a downwardly inclined channel 12ª, the upper edge of which abuts against the underside of the top cover plate 1 and the lower edge against the inner wall of the vertical plate 8,—said channel is riveted to the girder channels by rivets 13. To the face of the end plate 8 is riveted or thoroughly bolted a bumper or buffer 14 of typical construction, there being a central opening through said buffer and plate 8 for the passage therethrough of a car coupling of the usual design (not shown). Within the girder and solidly fastened therein a short distance from the buffer 14 are rigidly fastened typical draft bar mechanisms 15 and 16 for connection to the coupling. The openings 17 and 17ª through plate 8 are for bolts or rivets for fastening the bumper 14 in place and the opening 18 is for the passage therethrough of a car coupling shank (not shown).

Attention is now directed to the fact that the cross channels 5 at either end of the car frame A are employed as tank stops to prevent longitudinal movement of the tank B, as best seen in Fig. 2, and it will be observed that these channels in connection with the bent plate 6, its lower extension 8, stiffening channel 10, angles 7, and interior channel 12ª produce a structure of extreme rigidity where such rigidity is an essential; i. e. at the point of reception of the shock of the liquid in the tank flowing backward and forward and impacting against the tank heads C, and at the point where the tractive force is transmitted through the couplings. It will be further noted that the line of tractive force closely approaches the ventral axis of the girder A.

To the top face of girder A, transversely thereof, with its back in contact therewith and flanges upstanding, is a heavy structural channel iron 25. This channel overlaps the girder A equally on either side, is of a length to produce a car of M. C. B. standard width or practically so, and is securely riveted to said girder A by means of rivets 26. Fitted between the flanges of channel 25 and extending a proper distance thereabove is a hard wood saddle block 27, the upper face of which is convexed to meet the contour of the tank B. It is to be understood that the deepest part of the convexure is located directly above the longitudinal center line of the girder for obvious reasons. Said block is of considerable less length than channel 25 and is held in fixed position thereon by a plurality of through bolts 28, bearing upon proper washer straps 29 to prevent indentation of the wood. To the lower face of girder A, directly beneath and in alinement with channel, there is riveted a similar but shorter channel iron 30, an equal overlap of said channel is established on either side of the girder and the outer ends are bent upwardly as at 31 and 32. Between the flanges of the channel 30, directly beneath the girder is fixed a heavy bolster block 33, having a circular perpendicular opening 34 for the reception of the usual round trunnion of a typical truck frame (not shown). Near the outer ends 31 and 32 are located members 35 and 36 for the purpose of providing side bearings of the truck just above mentioned.

Extending upwardly and inclined inwardly from the upper face of channel 30 near the outer ends thereof to the under face of channel 25 are channel iron posts 37 and 38. At their lower ends they are secured to channel 30 by angles 39 and 40 and rivets 41, while gusset plates 42 and 43 are employed to secure a proper connection to channel 25. Said gusset plates are of such shape as to receive the upper ends of channel struts 44 and 45 which extend to the fillets in the lower flanges of the beams 2 and 3 where the same are fastened in place by angles 46 and rivets 47. It will thus be seen that the structure just described serves the double purpose of a saddle for the tank B and a frame work by which the car body is supported upon its trucks, and it is to be understood that two of these structures, designated as a whole by the reference letter S in the drawings, are located upon the box-girder A, a short distance from its ends, which distance varies with the length of the car body and tank and the load to be carried.

Located intermediate of and in spaced relation to structures S, there are located on girder A a plurality of transverse channels 50, of the same length as channel 25, with their outer ends in alinement. Said channels 50 are riveted to girder A by means of rivets 51, Fig. 1. Fitted between the flanges of the channel 50 are timber saddles 52 which are duplicates of the saddle 27 and are maintained in position by through bolts 53 bearing upon washer plates 54. Extending from the outer ends of channel 50 to the bottom flanges of channels 2 and 3 of girder A are flat knee braces 55 and 56, and, stiffening these braces, are diagonal braces 57 and 58. These structures, designated T as a whole, form the intermediate supports for the tank B, and while of comparatively light weight, are amply strong for the purpose intended and possess sufficient elasticity to prevent fatigue of metal resulting from the incessant shocks received in service. Passing around the tank B are a number of hooped rods 59, the ends of which pass through channels 50, and nuts 60 being provided to tighten these rods to prevent the displacement of the tank.

F and Fª are wooden runways extending from end to end of the car body and are fastened to the outer ends of the channels 25 and 50, Fig. 1, while at the ends shorter transverse runways 51 are provided.

While herein I have disclosed the preferred method of practising my invention, I desire it understood that I may make such changes and alterations therein as might suggest themselves to the skilled mechanic or permitted under the doctrine of equivalents.

Having thus fully disclosed my invention I claim as new and desire to secure to myself by Letters Patent of the United States:—

1. In a tank car body, a longitudinal box girder extending the entire length thereof, upstanding members located transversely of and near the ends of said girder, on the upper face thereof, reinforcing members declined from the top of said upstanding members to the ends of said girder, and then bent downwardly in front of the ends of said girder, respectively, and rigidly fixed thereto.

2. In a tank car body, a longitudinal box girder extending the entire length thereof, upstanding members located transversely of and near the ends of said girder, on the upper face thereof, reinforcing members declined from the top of said upstanding members to the ends of said girder, and then bent downwardly in front of the ends of said girder, respectively, and fixed rigidly thereto, and horizontal stiffening members fixed to the upper face of said girder between said upstanding members and said declining members and rigidly connected thereto, respectively.

3. In a tank car body, a longitudinal box girder extending the entire length thereof, upstanding members located transversely of and near the ends of said girder, on the upper face thereof, reinforcing members declined from the top of said upstanding members to the ends of said girder, and then bent downwardly in front of the ends of said girder, respectively, and rigidly fixed thereto and stiffening members within said girder and fixed therein and declining from the top of said girder at points beneath said upstanding members to and abutting the members rigidly fixed to the ends of said girder.

4. In a tank car body, a longitudinal box girder extending the entire length thereof, upstanding members located transversely of and near the ends of said girder, on the upper face thereof, reinforcing members declined from the top of said upstanding members to the ends of said girder, and then bent downwardly in front of the ends of said girder, respectively, and rigidly fixed thereto, and horizontal stiffening members fixed to the upper face of said girder between said upstanding members and said declining members and rigidly connected thereto, respectively, and stiffening members within said girder and fixed therein and declining from the top of said girder at points beneath said upstanding members to and abutting the members rigidly fixed to the ends of said girder.

In testimony whereof I have hereunto set my hand in the presence of two subscribing witnesses.

JOHN FRANKLIN EWELL.

In the presence of—
N. W. MILLAR, Jr.,
FRED R. RILEY.